US008840287B2

(12) United States Patent
An et al.

(10) Patent No.: US 8,840,287 B2
(45) Date of Patent: Sep. 23, 2014

(54) INTERIOR AUTOMOTIVE COMPONENTS WITH ILLUMINATED REFLECTIVE SURFACE

(75) Inventors: Chae An, Northville, MI (US); Jonathan Quijano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 214 days.

(21) Appl. No.: 13/398,047

(22) Filed: Feb. 16, 2012

(65) Prior Publication Data

US 2013/0215637 A1   Aug. 22, 2013

(51) Int. Cl.
*B60Q 3/04* (2006.01)

(52) U.S. Cl.
USPC .......................... 362/489; 362/511; 362/23.14

(58) Field of Classification Search
USPC .............. 362/23.09, 23.14, 489, 511, 95, 100
See application file for complete search history.

(56) References Cited

U.S. PATENT DOCUMENTS

| | | | |
|---|---|---|---|
| 4,823,238 A | 4/1989 | Bauer et al. | |
| 4,916,591 A | 4/1990 | Schiele | |
| 4,935,850 A | 6/1990 | Smith, Jr. | |
| 5,452,186 A | 9/1995 | Dassanayake | |
| 5,498,883 A | 3/1996 | Lebby et al. | |
| 5,988,842 A | 11/1999 | Johnsen et al. | |
| 6,710,718 B2 | 3/2004 | Rose | |
| 6,974,238 B2 | 12/2005 | Sturt et al. | |
| 7,210,829 B2 * | 5/2007 | Okazaki et al. | 362/489 |
| 7,344,277 B2 | 3/2008 | Anderson, Jr. et al. | |
| 7,524,074 B2 | 4/2009 | Chery et al. | |
| 7,938,566 B2 | 5/2011 | Ishida et al. | |
| 7,967,486 B2 | 6/2011 | Ludwig et al. | |
| 8,075,173 B2 | 12/2011 | Shallcross et al. | |
| 2006/0034092 A1 | 2/2006 | Okazaki et al. | |
| 2009/0196058 A1 | 8/2009 | Ishida et al. | |
| 2010/0214795 A1 | 8/2010 | Salter et al. | |

* cited by examiner

*Primary Examiner* — Ismael Negron
(74) *Attorney, Agent, or Firm* — Christopher G. Darrow; Young Basile Hanlon & MacFarlane, P.C.

(57) ABSTRACT

An illuminating apparatus and method for an interior passenger compartment of a vehicle including, in combination, a panel, a manual operation element mounted to the panel, and a hidden light source mounted behind the panel providing indirect light directed along a path extending downwardly across a visible surface of the panel through an aperture in the panel. A bezel can be associated with the manual operation element. The bezel can define an edge with a reflective surface. The bezel is located on the visible surface of the panel within the path of indirect light. The edge reflects indirect light from the hidden light source to be visible to occupants of the passenger compartment of the vehicle.

15 Claims, 2 Drawing Sheets

INTERIOR AUTOMOTIVE COMPONENTS WITH ILLUMINATED REFLECTIVE SURFACE

FIELD OF THE INVENTION

The present invention relates to an apparatus and method for highlighting an element located within an interior passenger compartment of a vehicle using reflected light from a hidden light, and more particularly to a contoured reflective surface associated with a vehicle control or accessory for highlighting a location of the control or accessory by reflecting light in all directions to become visible to interior vehicle occupants.

BACKGROUND

Various automotive interior illumination devices are generally known from U.S. Pat. No. 8,075,173; U.S. Pat. No. 7,967,486; U.S. Pat. No. 7,938,566; U.S. Pat. No. 7,210,829; U.S. Pat. No. 6,974,238; U.S. Pat. No. 5,452,186; U.S. Published Application No. 2010/0214795; U.S. Published Application No. 2009/0196058; and U.S. Published Application No. 2006/0034092. Generally, a dashboard or instrument panel installed in a front interior area of an automobile is provided with various components and manual operation elements, such as switches and one or more wind-direction adjusting levers for one or more ventilation registers of an interior heating/ventilation/air-conditioning (HVAC) system of the vehicle. When an occupant of a vehicle experiences a dark environmental operating condition, illumination is required to assist the occupant to recognize the shape and position of various components and manual operation elements of the dashboard, so as to ensure usability or user-friendliness in using or manually operating such components and elements.

In a conventional illumination system, where the illumination member is incorporated into an instrument panel or dashboard to ensure user-friendliness, illumination light from the illumination member may directly come within the field of view of a driver sitting in a front seat of a vehicle interior. Even if an indirect illumination technique is used in the illumination system associated with an instrument panel or dashboard, illumination light from an illumination member may directly come within the field of view of a driver sitting in a front seat of a vehicle interior depending on the position of the illumination member and the direction of the illumination light. Illumination light directly coming within the field of view of a driver during dark environmental operating conditions is generally considered to be undesirable.

SUMMARY

It would be desirable to provide illumination to assist the occupant of a vehicle to recognize the shape and position of various components and elements of the instrument board panel so as to ensure usability or user-friendliness in using or manually operating such components and elements without directly coming within the field of view of the driver during dark environmental operating conditions. It would be desirable to improve an appearance of a vehicle interior by creating accent light features around components and/or manual operation elements, by way of example and not limitation, such as one or more ventilation registers. It would be desirable to make a vehicle interior more attractive, and to make the location of components and manual operation elements easier to find during dark environmental operating conditions. It would be desirable to highlight a chrome bezel associated with a component and/or manual operation element, such as a ventilation register, using light from a hidden light (e.g., a light pipe).

In an interior passenger compartment of a vehicle, an illuminating apparatus can include, in combination, an instrument board panel, a manual operation element mounted to the panel, and a hidden light source mounted behind the panel providing indirect light directed along a path extending downwardly across a visible surface of the panel through an aperture in the panel. The illuminating apparatus can provide a bezel connected with the manual operation element. The bezel can have at least one cross sectional area with a non-planar shaped contour defining an edge, and a reflective surface located on the bezel covering the edge. The reflective surface can be located on the visible surface of the panel within the path of indirect light from the hidden light pipe. The edge can reflect indirect light from the hidden light to be visible to occupants of the passenger compartment of the vehicle as a light feature highlighting the manual operation element.

A method is provided for assembling a light feature highlighting a manual operation element located on an instrument board panel within a passenger compartment of a vehicle during dark environmental operating conditions. The method can include mounting a light hidden source behind the instrument board panel, directing indirect light from the light source along a path extending downwardly across a visible surface of the instrument board panel through an aperture in the panel, and locating a reflective edge in association with the manual operation element on the visible surface of the instrument board panel within the path of indirect light from the hidden light. The reflective edge reflects indirect light from the light source to be visible to occupants of the passenger compartment of the vehicle, thereby highlighting the manual operation element during dark environmental operating conditions.

An illuminating apparatus can be mounted within an interior passenger compartment of an automobile for casting visible radiant energy in at least one direction to render objects in that direction visible. An instrument board panel can be located within the passenger compartment of the automobile and can contain or support at least one manual operation element. The illuminating apparatus can include a hidden light source mounted behind the instrument board panel providing indirect light to an interior passenger compartment of the automobile. The indirect light can be directed along a path extending downwardly across a visible surface of the instrument board panel through an aperture in the instrument board panel facilitating viewing of the instrument board panel. A reflective surface can be connected to the manual operation element and can be located on the visible surface of the instrument board panel. The reflective surface can have an edge located in the path of the indirect light. The edge can reflect indirect light from the hidden light source to be visible to occupants of the passenger compartment of the automobile highlighting the manual operation element during dark environmental operating conditions.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
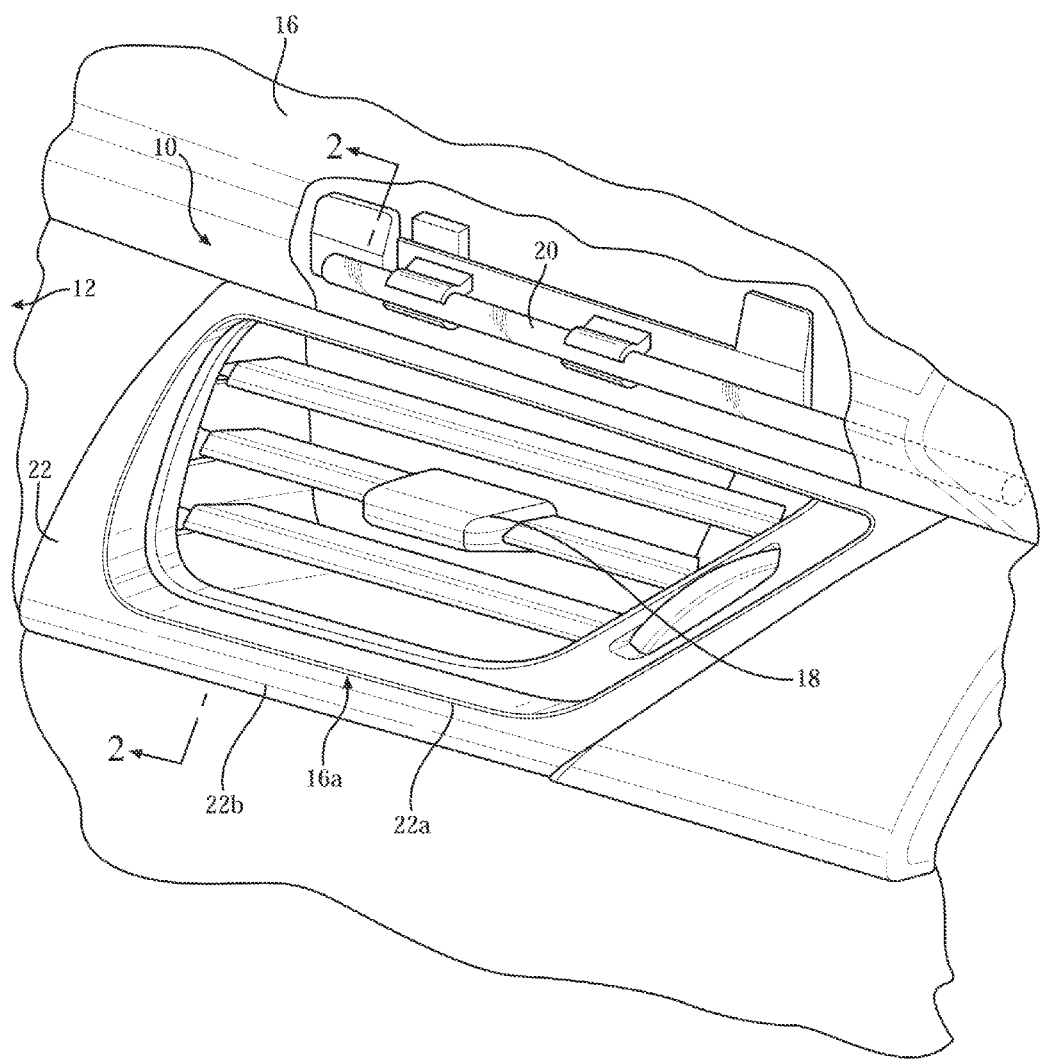
FIG. 1 is a perspective view of a dashboard or control panel having light from a light pipe mounted behind the panel shining down on a chromed bezel creating lines of light around a component or manual operation element, such as a ventilation register during dark environmental operating conditions.
Figure 2:
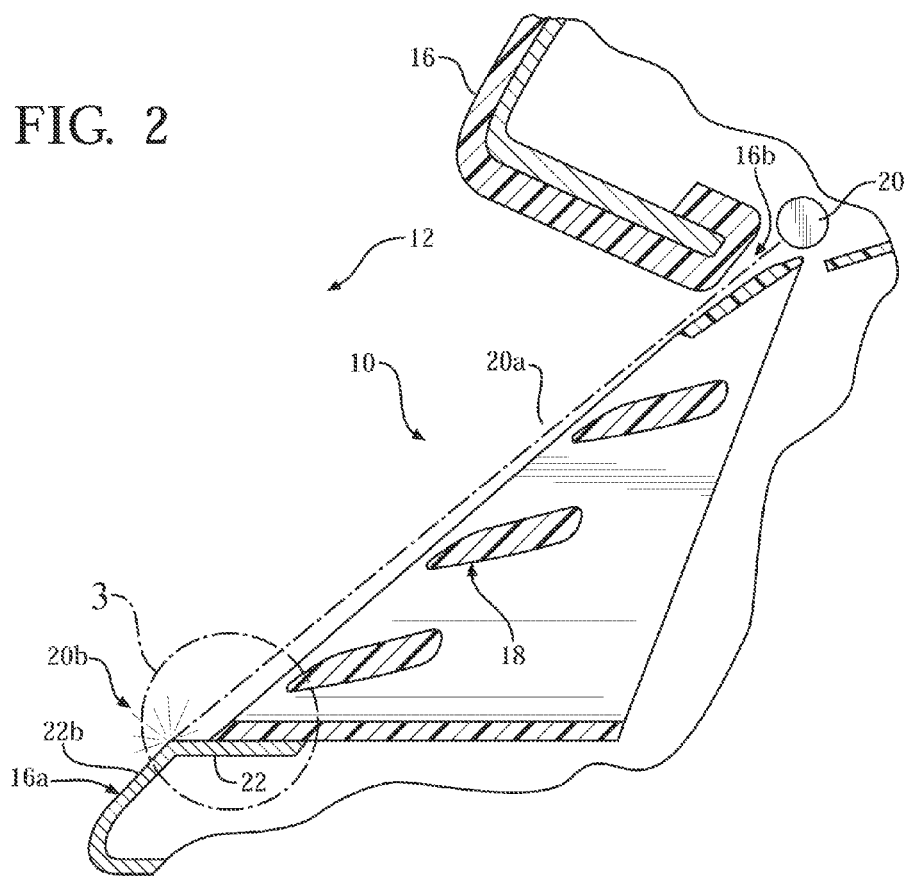
FIG. 2 is a cross sectional view of the dashboard or control panel illustrating light from the light pipe source striking a corner edge of the chromed bezel to spread the light wide to be visible to vehicle occupants.
Figure 3:
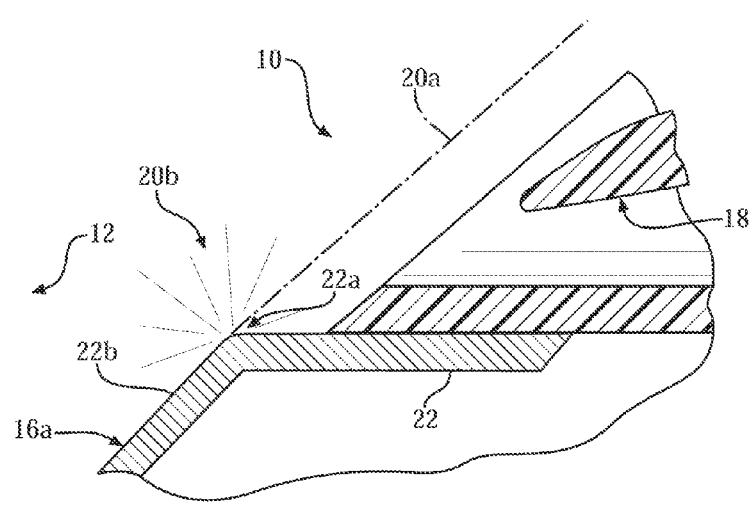
FIG. 3 is a detailed cross sectional view illustrating a corner edge of the chromed bezel being struck by the light from the light pipe source and reflected or refracted at an angle to create a line of light visible to occupants of the vehicle.

Referring now to FIGS. 1-3, an illuminating apparatus 10 in an interior passenger compartment 12 of a vehicle can include, in combination, an instrument board panel 16, a manual operation element 18 mounted to the panel 16, and a light pipe 20 mounted hidden behind the panel 16. The light pipe 20 provides indirect light 20a directed along a path extending downwardly across a visible surface 16a of the panel 16 through an aperture 16b in the panel 16. The illuminating apparatus 10 can include a bezel 22 associated with, or connected to, the manual operation element 18. The bezel 22 can have at least one cross sectional area with a non-planar shaped contour defining a corner edge 22a. A reflective surface 22b located on the bezel 22 covers the corner edge 22a. The reflective surface 22b can be mounted to, or located on, the visible surface 16a of the panel 16 within the path of indirect light 20a from the hidden light pipe 20. The corner edge 22a reflects indirect light 20b from the hidden light pipe 20 to be visible to occupants of the passenger compartment 12 of the vehicle 14 as a light feature highlighting the manual operation element 18.

The corner edge 22a of the bezel 22 can be rounded to reflect light into the passenger compartment 12 of the vehicle. The corner edge 22a of the bezel 22 can extend around an entire periphery of the manual operation element 18. The reflective surface 22b covering the corner edge 22a of the bezel 22 can be a chromed surface, or any other reflective surface capable of reflecting indirect light 20b from the hidden light pipe 20 into the passenger compartment 12 of the vehicle.

By way of example and not limitation, the manual operation element 18 can be a ventilation register, such as used for a heating/ventilation/air conditioning (HVAC) system of the vehicle. The bezel 22 can be formed integrally with the panel 16, or as a separate piece for assembly or mounting to the panel 16. The instrument board panel 16 can be formed as part of, or can be assembled to, the front dashboard of a vehicle, or can be formed of, or can be assembled to, a separate rear passenger control panel. By way of example and not limitation, the instrument board panel 16 can be defined as part of a rear seat passenger HVAC control system, or as a portion of a front seat HVAC control system.

A method is disclosed for assembling a light feature highlighting a manual operation element 18 located on an instrument board panel 16 within a passenger compartment 12 of a vehicle during dark environmental operating conditions. The method can include mounting a light pipe 20 hidden behind the instrument board panel 16, directing indirect light 20a from the light pipe 20 along a path extending downwardly across a visible surface 16a of the instrument board panel 16 through an aperture 16b in the panel 16, and locating a reflective corner edge 22a associated with the manual operation element 18 on the visible surface 16a of the instrument board panel 16 within the path of indirect light 20a from the hidden light pipe 20 for reflecting indirect light 20b from the light pipe 20 with the reflective corner edge 22a to be visible to occupants of the passenger compartment 12 of the vehicle 14, thereby highlighting the manual operation element 18 during dark environmental operating conditions.

The method can also include one or more of the following processes, either singularly or in any combination. The method can include forming a rounded reflective corner edge 22a associated with the manual operation element 18. The method can include forming a chromed surface 22b to define the reflective corner edge 22a associated with the manual operation element 18. The reflective corner edge 22a can be formed to extend entirely around a periphery of the manual operation element 18. As previously indicated, the method can include forming the manual operation element 18 as a ventilation register.

In one aspect an, illuminating apparatus 10 can be mounted within an interior passenger compartment 12 of an automobile for casting visible radiant energy in at least one direction to render objects in that direction visible. An instrument board panel 16 can be located within the passenger compartment 12 of the automobile and can contain at least one manual operation element 18. The illuminating apparatus 10 can include a light pipe 20 mounted hidden behind the instrument board panel 16 and providing indirect light 20a to an interior passenger compartment 12 of the automobile. The light 20a can be directed along a path extending downwardly across a visible surface 16a of the instrument board panel 16 through an aperture 16b in the instrument board panel 16 facilitating viewing of the instrument board panel 16. A reflective surface 22b can be connected to, or associated with, the manual operation element 18. The reflective surface 22b can be located on the visible surface 16a of the instrument board panel 16. The reflective surface 22b can have a corner 22a located in the path of the indirect light 20a. The corner 22a can reflect indirect light 20b from the light pipe 20 to be visible to occupants of the passenger compartment 12 of the automobile 14 highlighting the manual operation element 18.

The corner 22a of the reflective surface 22b can be non-planar, or contoured, by way of example and not limitation, such as a rounded corner having a predetermined radius of curvature. By way of example and not limitation, the reflective surface 22b can be a chromed surface. The reflective surface 22b can extend either partially or completely around an entire periphery of the manual operation element 18. By way of example and not limitation, the manual operation element 18 can be a ventilation register having one or more manually operated louvers for directing air flow into the passenger compartment of the vehicle.

The illuminating apparatus 10 can highlight a chrome reflective surface 22a of a bezel 22 surrounding an opening of a ventilation register, or other manual operation element 18, using indirect light 20a from a hidden light pipe 20 located behind a panel 16. This configuration improves the appearance of the vehicle interior around the manual operation element 18, such as a ventilation register, by creating an accent light feature around the manual operation element 18. The reflected indirect light makes the vehicle interior more attractive, and makes the location of the manual operation element 18, such as a ventilation register, easier to find at night. In operation, light 20a from the light pipe 20 shines down on the reflective surface 22b, such as a chromed surface, of the bezel 22 associated with the manual operation element 18, such as a ventilation register, creating lines of light reflected by the curved corner edge 22a of the bezel 22. The curved corner edge 22a, and associated reflected lines of light, can surround the manual operation element 18, such as a ventilation register. This creates distinctive highlights that appear as a line of light associated with the non-planar corner edge 22a of the bezel 22. Although light 20a shines on all of the reflective surface 22b, such as a chromed surface, of the bezel 22 of the manual operation element 18, only the edges 22a have lines of light, since light striking a flat surface is reflected down and away from vehicle occupants. Radii on edges 22a of the bezel 22 reflect the light in all directions, so the reflected light 20b becomes visible to interior occupants of the vehicle. As best seen in FIGS. 2-3, only the edges 22a light up and create the line of reflected light 20b. A mirror like finish of the reflective surface 22b, such as a chromed surface, of the bezel 22 and the positioning of the light pipe 20 ensures that light 20a not striking the corner edges 22a of the bezel 22 reflects down and away from the point of view of vehicle occupants. However, the corner edge 22a of the bezel 22 associated with the manual operation element 18 ensures that the reflected light 20b is spread wide to be visible to the vehicle occupants.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle interior illuminating apparatus comprising:
an instrument board panel including an aperture, and a manual operation element mounted to the panel;
a light pipe mounted hidden behind the panel and providing light directed along a path extending downwardly across a visible surface of the panel through the aperture in the panel:
a bezel connected with the manual operation element, the bezel having at least one cross sectional area with a non-planar shaped contour defining an edge; and
a highly reflective surface covering at least the edge, and positioned within the direct path of light from the light pipe, the edge reflecting light from the light pipe for highlighting the manual operation element.

2. The illuminating apparatus of claim 1, wherein the edge is rounded.

3. The illuminating apparatus of claim 1, wherein the reflective surface is a chromed surface.

4. The illuminating apparatus of claim 1, wherein the reflective surface extends around an entire periphery of the manual operation element.

5. The illuminating apparatus of claim 1, wherein the manual operation element is a ventilation register.

6. A method for assembling a light feature highlighting a manual operation element located on an instrument board panel within a passenger compartment of a vehicle during dark environmental operating conditions comprising:
mounting a manual operation element to an instrument board panel within the vehicle;
forming an aperture in the instrument board panel;
mounting a light pipe hidden behind the instrument board panel;
directing light from the light pipe along a path extending downwardly across a visible surface of the instrument board panel through the aperture in the panel; and
locating a highly reflective edge in association with the manual operation element on the visible surface of the instrument board panel within the path of direct light from the light pipe for reflecting light from the light pipe for highlighting the manual operation element during dark environmental operating conditions.

7. The method of claim 6 further comprising:
forming a rounded reflective edge associated with the manual operation element.

8. The method of claim 6 further comprising:
forming a chromed surface to define the reflective edge associated with the manual operation element.

9. The method of claim 6 further comprising:
extending the reflective edge entirely around a periphery of the manual operation element.

10. The method of claim 6 further comprising:
forming the manual operation element as a ventilation register.

11. A vehicle interior illuminating apparatus mounted within an interior passenger compartment of an automobile for casting visible radiant energy in at least one direction to render objects in that direction visible, the illuminating apparatus comprising:
an instrument board panel having an aperture and a manual operation element mounted in the panel;
a light pipe mounted hidden behind the instrument board panel providing direct light along a path extending downwardly across a visible surface of the instrument board panel through an aperture in the instrument board panel; and
a highly reflective surface covering at least an edge of the manual operation element the edge reflecting direct light from the light pipe to be visible to occupants of the passenger compartment of the automobile for highlighting the manual operation element.

12. The illuminating apparatus of claim 11, wherein the edge of the reflective surface is rounded.

13. The illuminating apparatus of claim 11, wherein the reflective surface is a chromed surface.

14. The illuminating apparatus of claim 11, wherein the reflective surface extends around an entire periphery of the manual operation element.

15. The illumination apparatus of claim 11, wherein the manual operation element is a ventilation register.

* * * * *

UNITED STATES PATENT AND TRADEMARK OFFICE
CERTIFICATE OF CORRECTION

PATENT NO.        : 8,840,287 B2                                      Page 1 of 1
APPLICATION NO.   : 13/398047
DATED             : September 23, 2014
INVENTOR(S)       : Chae An et al.

It is certified that error appears in the above-identified patent and that said Letters Patent is hereby corrected as shown below:

In the Claims

In Claim 11, Column 6, line 42, after "element" please add -- , --.

Signed and Sealed this
Sixteenth Day of December, 2014

Michelle K. Lee
*Deputy Director of the United States Patent and Trademark Office*